US009652548B2

(12) United States Patent
Kapicioglu et al.

(10) Patent No.: US 9,652,548 B2
(45) Date of Patent: May 16, 2017

(54) VENUE PREDICTION BASED ON RANKING

(71) Applicant: Yellowpages.com LLC, Tucker, GA (US)

(72) Inventors: Cagatay Berk Kapicioglu, New York, NY (US); David Rosenberg, New York, NY (US)

(73) Assignee: YELLOWPAGES.COM LLC, Tucker, GA (US)

(\*) Notice: Subject to any disclaimer, the term of this patent is extended or adjusted under 35 U.S.C. 154(b) by 0 days.

(21) Appl. No.: 14/716,807

(22) Filed: May 19, 2015

(65) Prior Publication Data

US 2016/0012068 A1    Jan. 14, 2016

Related U.S. Application Data

(63) Continuation of application No. 13/751,738, filed on Jan. 28, 2013, now Pat. No. 9,047,316, which is a
(Continued)

(51) Int. Cl.
*G06F 17/30* (2006.01)
*H04L 29/08* (2006.01)

(52) U.S. Cl.
CPC ...... *G06F 17/3087* (2013.01); *G06F 17/3053* (2013.01); *G06F 17/30241* (2013.01);
(Continued)

(58) Field of Classification Search
CPC ........... G06F 17/3087; G06F 17/30554; G06F 17/30598; G06F 17/3053; G06F 17/30241; H04L 67/18
See application file for complete search history.

(56) References Cited

U.S. PATENT DOCUMENTS 8,200,247 B1    6/2012  Starenky et al.
8,768,313 B2 \*  7/2014  Rodriguez ......... G06K 9/00986
                                                    382/118
(Continued)

OTHER PUBLICATIONS

Office Action mailed Jun. 4, 2015 in U.S. Appl. No. 13/668,602, 13 pages.
(Continued)

*Primary Examiner* — Leslie Wong
(74) *Attorney, Agent, or Firm* — Alston & Bird LLP

(57) ABSTRACT

A technique is disclosed for presenting possible cheek-in venues to a mobile device user, such as for the purpose of checking in with social networking services such as Foursquare. The disclosed technique operates by training a model during an initial training sequence. The trained model, representing a teamed hypothesis, describes venues that are ranked according to their relevance to users who are also described by the model. During a subsequent run-time sequence, the system receives real-time geolocation data that represents users, wherein the data includes user geolocation and the level of accuracy of the geolocation. The system generates a set of candidate venues, ranks the generated candidate venues by applying the learned hypothesis, which can be dependent on the level of accuracy, and presents the user with the ranked venues as possible cheek-in venues. The user can then select the venue actually being checked into from the presented check-in venues.

20 Claims, 9 Drawing Sheets

Related U.S. Application Data continuation-in-part of application No. 13/668,602, filed on Nov. 5, 2012.

(60) Provisional application No. 61/655,073, filed on Jun. 4, 2012.

(52) U.S. Cl.
CPC .. *G06F 17/30554* (2013.01); *G06F 17/30598* (2013.01); *H04L 67/18* (2013.01)

(56) References Cited

U.S. PATENT DOCUMENTS

| | | | | |
|---|---|---|---|---|
| 8,909,629 | B2* | 12/2014 | Seth et al. | G06Q 30/02 |
| | | | | 707/724 |
| 9,047,316 | B2* | 6/2015 | Kapicioglu et al. | G06F 17/30241 |
| 2010/0211308 | A1 | 8/2010 | Zheng et al. | |
| 2011/0072034 | A1* | 3/2011 | Sly | G01C 21/32 |
| | | | | 707/769 |
| 2011/0276565 | A1 | 11/2011 | Zheng et al. | |
| 2013/0046456 | A1* | 2/2013 | Scofield | G01C 21/3423 |
| | | | | 701/117 |
| 2013/0073422 | A1 | 3/2013 | Moore et al. | |
| 2013/0073631 | A1* | 3/2013 | Patton | G06Q 10/10 |
| | | | | 709/204 |
| 2013/0097246 | A1* | 4/2013 | Zifroni | G06Q 50/01 |
| | | | | 709/204 |
| 2013/0203423 | A1 | 8/2013 | Alles et al. | |
| 2013/0218683 | A1* | 8/2013 | Hannan | G06Q 30/0261 |
| | | | | 705/14.58 |
| 2013/0226857 | A1* | 8/2013 | Shim | G06N 5/048 |
| | | | | 706/52 |
| 2013/0267252 | A1* | 10/2013 | Rosenberg | H04W 4/02 |
| | | | | 455/456.3 |
| 2013/0317944 | A1* | 11/2013 | Huang | G01S 5/0252 |
| | | | | 705/26.61 |

OTHER PUBLICATIONS

USPTO, Office Action for U.S. Appl. No. 13/751,738, Jul. 31, 2014, 15 pgs., USA.

USPTO, Notice of Allowance for U.S. Appl. No. 13/751,738, Jan. 20, 2015, 14 pgs., USA.

USPTO, Office Action for U.S. Appl. No. 13/668,602, Dec. 2, 2015, 17 pgs., USA.

United States Patent and Trademark Office, Office Action for U.S. Appl. No. 13/668,602, Aug. 12, 2016, 22 pages, U.S.A.

* cited by examiner

VENUE PREDICTION BASED ON RANKING

CROSS REFERENCE TO RELATED APPLICATIONS

The present application is a continuation of U.S. patent application Ser. No. 13/751,738, filed on Jan. 28, 2013, which is a continuation-in-part of U.S. patent application Ser. No. 13/668,602, filed on Nov. 5, 2012, which claims the benefit of U.S. Provisional Patent Application No. 61/655,073, filed on Jun. 4, 2012, the entire disclosures of each of which are hereby incorporated herein by reference for all purposes.

FIELD OF THE INVENTION

The present invention relates to sensor analytics in general, and, more particularly, to predicting the venues that are being visited by a user.

BACKGROUND OF THE INVENTION

A mobile device, such as a smartphone or other type of wireless terminal, is typically equipped with a position determining function such as Global Positioning System (GPS). The position determining function determines the device's location and generates location data that represents the device and its location. The location data generated typically includes a device or user identifier, a latitude, a longitude, and a level of accuracy. The assessed location, or "geolocation," provided by the position determining function can be used to deliver location-based services to the user of the device.

Social networks such as Foursquare, Google Latitude, and Facebook Places rely on the location data generated by the user's mobile device in order to deliver location-based services to the user. Such services include providing, to the user, recommendations of nearby places, or "venues," to visit. These location-based services also enable a user to share his location via a "check-in," which is a virtual announcement that informs the user's social network that the user is visiting a venue.

When a user wants to check in, the user's geolocation is first provided to the social networking service being used. In doing so, the user's mobile device assesses the user's current location (i.e., the device's location) and provides the resulting geolocation to a computer server associated with the social networking service. The server then generates a set of possible check-in venues based on the geolocation. This set of venues is typically based on the proximity of the venues to the user's geolocation—that is, the closer a venue is to the user, the more likely it is to be part of the set of venues generated. The server then transmits the set of possible check-in venues to the user's device, which then presents the possible cheek-in venues for the user to select from.

FIG. 1 in the prior art depicts an example of how the set of possible check-in venues is presented to a user, though wireless terminal 100. Terminal 100 comprises physical display 101, which is capable of presenting the information conveyed in check-in display mode 102. Check-in display mode 102 comprises map display 103 and venue display 104.

Wireless terminal 100 presents map display 103, comprising the geolocation of user 105, in relation to local geographic information (e.g., streets, buildings, boundaries, etc.) displayed in well-known fashion. Map display 103 further comprises accuracy disk 106, which is a graphical indication derived from the level of accuracy of user 105's geolocation and is displayed in relation to the user's displayed geolocation. Accuracy disk 106 is relatively large when the level of accuracy is low and is relatively small when the level of accuracy is high. Terminal 100 also presents venue display 104, comprising the possible check-in venues that were transmitted to the terminal from the server.

The venues that are presented to the user in venue display 104 represent an assortment of businesses and other establishments that have one factor in common; they are all within a predetermined distance of the geolocation of user 105.

Various problems exist with basing a set of possible cheek-in venues on their proximity to the user. For example, the geolocation of the user might be grossly inaccurate. This can be attributed to Global Positioning System (GPS) and Assisted GPS (A-GPS) methods of geolocation used by many smartphones and other wireless terminals often having difficulty in providing a reliable geolocation result in city areas. The main reason for this is building heights and building walls preventing a wireless terminal from properly receiving signals from GPS satellites. Reliability problems also exist with some other geolocation methods as well. Because of a faulty geolocation having a relatively low level of accuracy, a service such as a social networking website might consequently generate a set of check-in venues that either are scattered throughout the user's general area or are nowhere near the actual, current location of the user.

What is needed is an improved technique for generating a set of possible check-in venues, without some of the disadvantages in the prior art.

SUMMARY OF THE INVENTION

The present invention enables the construction and use of a technique that is able to generate a set of possible check-in venues without some of the disadvantages in the prior art. In accordance with the illustrative embodiment of the present invention, the technique disclosed herein attempts to predict the venue that a user is or will be checking into. The disclosed technique generates possible check-in venues that are relevant to a user, in a way that is at least partially independent of proximity to the user's geolocation, and then presents one or more of those check-in venues to the user. Because the disclosed technique is able to operate independently of proximity, the technique is particularly ideal in situations where the geolocation of the user does not align with the known location of the venue that the user actually checks into.

As part of the overall technique, the data-processing system of the illustrative embodiment initially trains a model by using a training dataset of past check-ins. The trained model, representing a learned hypothesis, ranks venues according to their relevance to one or more users. Applying the learned hypothesis to newly received, geolocation data from a user, the data-processing system ranks candidate venues, and the ranked results can then be presented to the user as the possible check-in venues.

In ranking the candidate venues, the data-processing system of the illustrative embodiment uses current data that include, for example and without limitation, user identifiers, the geolocations of the users at their wireless terminals, the level of accuracy of the geolocations, and the calendrical times that correspond to the identified users being at the determined locations. From this data, the system determines candidate venues. The system of the illustrative embodiment ranks the candidate venues and then presents one or more of the ranked venues to a user. In some embodiments of the present invention, the data-processing system can use the received level of accuracy to determine which hypothesis to apply to the candidate venues for ranking purposes.

The system of the illustrative embodiment disclosed herein comprises features that distinguish it from at least some systems in the prior art. The disclosed system generates a set of possible check-in venues, based on a relative ranking of candidate venues for a particular user. This is in contrast to generating a set of check-in venues based solely on their proximity to the geolocation of the user. Ranking the venues is particularly advantageous in situations where a user is not checking into the venue closest to his current geolocation, for example and without limitation, where:
  i. the user is still traveling towards a venue that he will be visiting,
  ii. the user chooses not to check in to a venue until after he leaves the venue,
  iii. the location information for the venue itself is incorrect, or
  iv. the received geolocation has a level of accuracy that does not permit a satisfactory result based only on venue proximity to the user's geolocation.

The disclosed system generates a set of possible check-in venues based on a ranking of candidate venues for a particular user, wherein ranking process is based on the particular user's past check-ins and, possibly, the past check-ins of other users. Basing the ranking on the user's check-in history is advantageous, in that is account for the user's own behavior. Basing the ranking additionally on the check-in history of other users is advantageous, in that it accounts for the popularity of venues.

The disclosed system, in some embodiments, utilizes a spatial feedback in which if a first user checked into a first venue, but not to nearby second venue, then it is assumed that the first user preferred the first venue to the second venue. Advantageously, this enables the disclosed system to train a model with which to sufficiently rank candidate venues for one or more additional users, and also obviates the need to receive negative "examples" in a system that is designed to receive and process venue check-ins, which are positive examples.

In some embodiments, the ranking provided by the disclosed system is based on one or more contexts such as time (e.g., morning, evening, weekday, weekend, etc.), venue characteristics (e.g., restaurant, dry cleaner, clothing store, etc.), user characteristics (e.g., commuter, college student, soccer mom, etc.), and so on. As a result, the disclosed system is able to customize the ranking so that a user, for example, receives a ranking of one or more lunch restaurants during the late-morning hours and a ranking of one or more bars during the evening hours. By considering one or more of these contexts, the significance of the resulting set of possible check-ins is improved.

The illustrative embodiment of the present invention features generating possible check-in venues within the context of a social networking service (e.g., Foursquare, etc.). It will be clear, however, to those skilled in the art, after reading this specification, how to make and use embodiments of the present invention in which the prediction of venues based on location accuracy is applied to a context other than social networking.

An illustrative embodiment of the present invention comprises: receiving, by a data-processing system, i) a first geolocation of a first user; generating, by the data-processing system, a non-empty set of candidate venues based on the first geolocation; ranking the candidate venues, by the data-processing system, based on applying, to the candidate venues, a hypothesis that is learned from locations of one or more venues that are visited by at least one of i) the first user and ii) one or more additional users, and wherein the ranking results in a non-empty set of possible check-in venues; and transmitting, by the data-processing system, the set of possible check-in venues to a device such that one or more of the possible check-in venues are displayable by the device.

BRIEF DESCRIPTION IN THE DRAWINGS

FIG. 1 in the prior art depicts an example of how the set of possible check-in venues is presented to a user, though wireless terminal 100.

DETAILED DESCRIPTION

Figure 1:
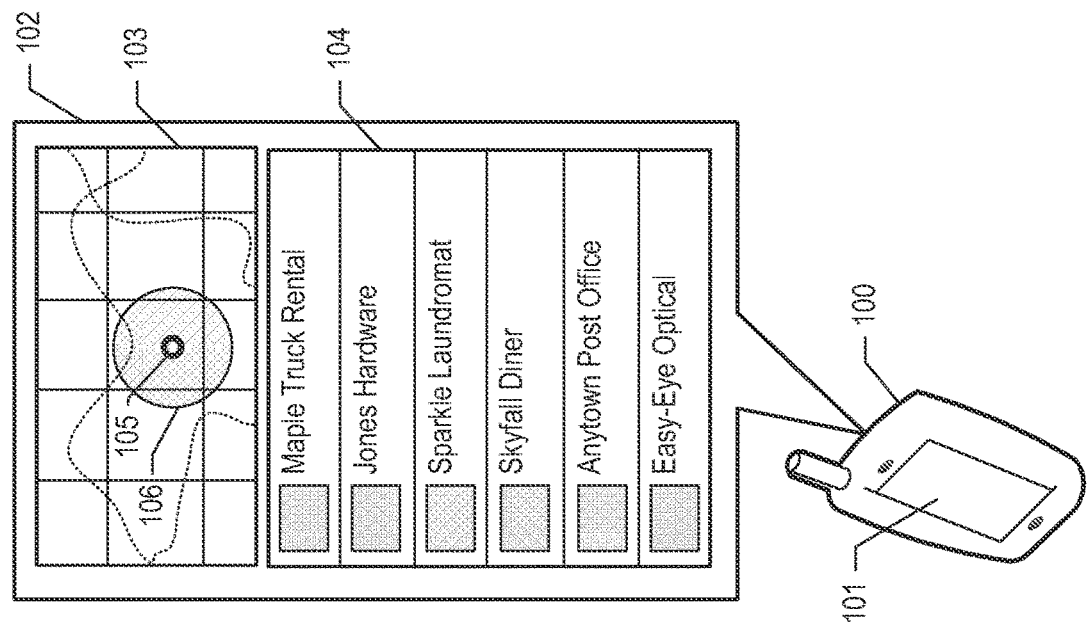

The following terms are defined for use in this Specification, including the appended claims:
  The term "location" is defined as a zero-dimensional point, a finite one-dimensional path segment, a finite two-dimensional surface area, or a finite three-dimensional volume.
  The term "venue," and its inflected forms, is defined as a place that can be visited by one or more users. A user might choose to identify explicitly that he is visiting a particular venue by sending a "check-in."
  The term "calendrical time T" is defined as the time as denominated in one or more measures (e.g., seconds, minutes, hours, time of day, day, day of week, month, month of year, year, etc.).
  The term "wireless terminal" is defined as a wireless telecommunications terminal that is capable of transmitting and/or receiving communications wirelessly. As is well known to those skilled in the art, a wireless terminal is also commonly referred to by a variety of alternative names such as a wireless transmit/receive unit (WTRU), a user equipment (UE), a mobile station, a fixed or mobile subscriber unit, a pager, a cellular telephone, a personal digital assistant (PDA), a computer, or any other type of mobile device capable of operating in a wireless environment. A wireless terminal can be used by its user to send a "check-in" at a venue, and can be used to present information to its user, among its other functions.

The term "spatial-temporal (S-T) event," or "event" and its inflected forms, is defined as any activity or occurrence that can be identified by the location and/or time at which it occurs. For example and without limitation, a spatial-temporal event can represent the arrival or departure of a person(s), animal(s), or product(s) to and/or from a specific geographic location such as, but not limited to, a place of employment, a transit terminal, a food store, a landmark, a shopping center, a hospital, a residence, a street, town, city, state, country, or any location determined by a global positioning system (GPS)-enabled device or assessed by other position determining equipment. A user checking in at a venue is an example of an S-T event.

The term "spatial-temporal (S-T) data point," or "data point," and its inflected forms, is defined as data or other information that identifies a specific event, user, or device at a specific location and/or time. For example and without limitation, a spatial-temporal data point can include: a time stamp along with a corresponding geographic location, such as, the time at a latitude and longitude; a time stamp along with an indicium of a specific event at a fixed geographic location, such as the time of a special or sale at a store or entertainment venue; measurement uncertainty information, such as the accuracy of the position determination; the occurrence of an event or action at a particular time and location, such as a taxi being full in the warehouse district at 2:00 am, texting occurring, tweeting occurring, etc.; details about a user communication, such as a Short Message Service (SMS) text having been sent; details about a visited venue, such as type of venue (e.g., bar, restaurant, etc.); or other supplemental information. Data points originate from various data sources that include, while not being limited to, a location enabled device such as a wireless terminal, a GPS enabled device, a networked device, a WiFi enabled device, a radio-frequency identification (RFID)-enabled device, and an automated teller machine (ATM) machine. A data point can represent a visit by a user to a determinable location of at a determinable time, or both, wherein the location and/or time can be determined from the contents of the data point or through other means. The information that constitutes a "check-in" sent by a user is conveyed by one or more data points.

Figure 2:
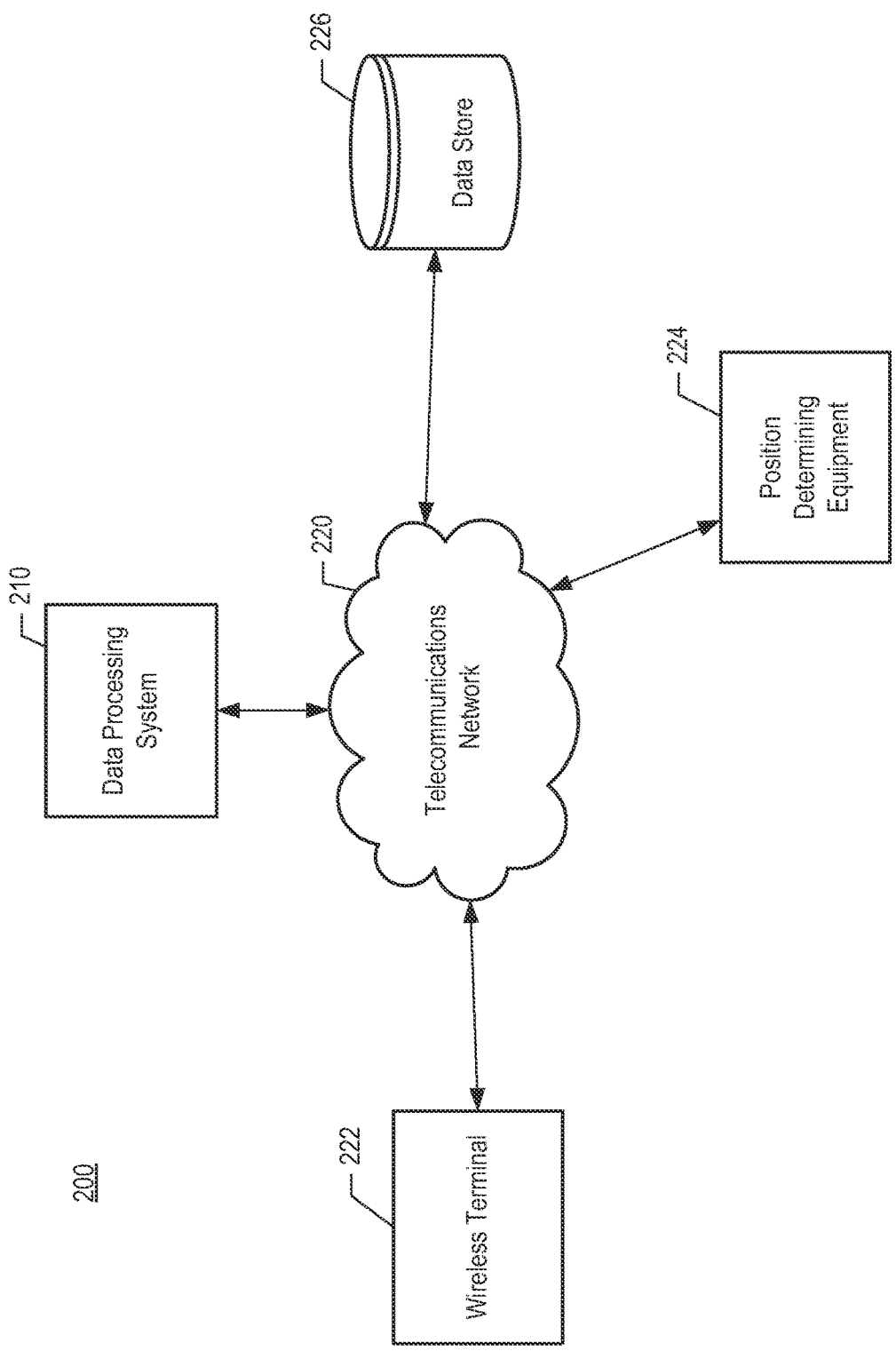
FIG. 2 depicts a block diagram of the salient components of sensor analytics system 200, in accordance with the illustrative embodiment of the present invention.

FIG. 2 depicts a block diagram of the salient components of sensor analytics system 200, in accordance with the illustrative embodiment of the present invention. FIG. 2 depicts data-processing system 210; telecommunications network 220; wireless terminal 222; position determining equipment (PDE) 224; and data store 226. The components depicted in FIG. 2 are interconnected as shown.

As those who are skilled in the art will appreciate, after reading this disclosure, sensor analytics system 200 can comprise additional components that also provide sources and repositories of data, in some embodiments of the present invention. Furthermore, in addition to the components depicted in FIG. 2, sensor analytics system 200 can also be connected to external components that provide additional sources and repositories of data, in some embodiments of the present invention.

Data-processing system 210 is a computer that comprises non-transitory memory, processing component(s), and communication component(s), as described in more detail in FIG. 2. Data-processing system 210 executes and coordinates the salient tasks of sensor analytics system 200 according to the illustrative embodiment of the present invention. For example, data-processing system 210 receives, via network 220, spatial and/or temporal data from one or more of the data sources, as described in detail below. Data-processing system 210 then analyzes the received data as described below and with respect to the tasks described in FIGS. 4 through 9. System 210 is able to send the results of the analysis to user devices (e.g., terminal 222, etc.) for presentation and/or store the results in data store 226 or elsewhere.

Telecommunications network 220 comprises a collection of links and nodes that enable telecommunication between devices, in well-known fashion. Telecommunications network 220 provides sensor analytics system 200 with connectivity to other systems that enable sensor analytics system 200 to retrieve data and also to transmit, store, and archive data as needed. In some embodiments of the present invention, telecommunications network 220 is the Public Switched Telephone Network (PSTN); in some embodiments of the present invention, network 220 is the Internet; in some embodiments of the present invention, network 220 is a private data network. It will be clear to those with ordinary skill in the art, after reading this disclosure, that in some embodiments of the present invention network 220 can comprise one or more of the above-mentioned networks and/or other telecommunications networks, without limitation. Furthermore, it will be clear to those will ordinary skill in the art, after reading this disclosure, that telecommunications network 220 can comprise elements that are capable of wired and/or wireless communication, without limitation.

Wireless terminal 222 is a user device within sensor analytics system 200. Terminal 222 comprises the hardware and software necessary to exchange information with other wireless terminals and other elements depicted in FIG. 2, in well-known fashion. Terminal 222 also comprises the hardware and software necessary to perform the actions described below and in the accompanying figures. For example and without limitation, wireless terminal 222 is capable of:
 i. generating spatial-temporal data, and transmitting some or all of that data to one or more other devices in system 200, and
 ii. receiving venue-related data and other data from data processing system 210, and presenting some or all of that data to its user, such as on a display.

In accordance with the illustrative embodiment of the present invention, wireless terminal 222 is global positioning system (GPS)-enabled and, accordingly, is capable of determining and reporting i) its own geolocation, which is also representative of the geolocation of the terminal's user, and ii) a level of accuracy of the reported geolocation. As those who are skilled in the art will appreciate, however, another element that is part of sensor analytics system 200 can determine and report the location of terminal 222 and accuracy of the reported location, such as position determining equipment 224.

Although sensor analytics system 200 as depicted in FIG. 2 comprises only one wireless terminal, it will be clear to those skilled in the art, after reading this disclosure, how to make and use alternative embodiments of the present invention that comprise any number of wireless terminals.

Position determining equipment (PDE) 224 is capable of determining the location of user devices such as wireless terminal 222, in well-known fashion. PDE 224 is also capable of providing the assessed geolocation of a device (and, by extension, of the device's user) and the level of accuracy of the assessed geolocation, with or without a timestamp, to data-processing system 210. PDE 224 is further capable of providing an indication of a spatial and/or temporal event occurring at a measured user device.

Data store 226 an electronic data storage device capable of providing data related to spatial and/or temporal events. The data provided by data store 226 may have originated from other sources of data, such as terminal 222 or PDE 224. Data store 226 comprises non-transitory memory (e.g., a hard disk, etc.) that is used by sensor analytics system 200 to store, archive, and retrieve information, in well-known fashion.

The data points provided to data-processing system 210 from the aforementioned devices can include information relating to and/or identifying one or more particular events, users, or devices at a certain location and/or time. In accordance with the illustrative embodiment of the present invention, system 210 receives data points that convey information sent as part of cheek-ins made by users who are identifying their presence at venues they are visiting.

In some embodiments of the present invention, the data points received by data-processing system 210 can include data provided from a wireless network-based communication device such as terminal 222. Such data may include, but is not limited to, i) the geolocation of a particular wireless terminal (e.g., terminal 222) a particular time and ii) the level of accuracy of the geolocation data. Alternatively, or in addition, the data may include user information, such as a user identifier (ID) or an account ID associated with a particular device. The data originating at a communication device can be passed directly from the device or indirectly through another device such as PDE 224 or data store 226. Moreover, the data can include information that relates to the user device from which it is being provided, such as whether the device is a cell phone, laptop, personal digital assistant or GPS-enabled device.

The data points may be provided to data-processing system 210 in real-time as an event or activity occurs, such as a check-in sent from wireless terminal 222. Alternatively, or in addition, data may be provided from a data provider or data aggregator. The data provider or data collector can collect the data points over a specified period prior to sending them to data-processing system 210. The stored data then may be provided to data-processing system 210 periodically or sporadically according to a predetermined schedule or at user-specified times.

In some embodiments of the present invention, the data provided to data-processing system 210 includes metadata about venues (e.g., type of venue, etc.) and users (e.g., birth date, gender, etc.), and additional demographic and/or commercial information, for example and without limitation. Such information can be of a general nature or can be specifically associated with the locations and/or times of one or more events and/or activities.

In some embodiments of the present invention, data-processing system 210, in order to perform some of its functions, also communicates, coordinates, and electronically with systems outside of sensor analytics system 200.

It will be clear to those skilled in the art, after reading the present disclosure, that the system illustrated in FIG. 2 can be embodied in different variations that are consistent with the present invention. For example, in some embodiments of the present invention, sensor analytics system 200 comprises displays other than, or in addition to, the display that is part of wireless terminal 222. For example, in some embodiments of the present invention, data store 226 comprises a plurality of data stores or a plurality of data storage technologies (e.g., a cloud-based storage system, etc.). For example, in some embodiments of the present invention, not all depicted components are on-site. For example, in some embodiments of the present invention, the depicted components are interconnected indirectly (e.g., through servers, gateways, switches, networks, the Internet, etc.). In any event, it will be clear to those skilled in the art, after reading the present disclosure, how to make and use sensor analytics system 200.

Figure 3:
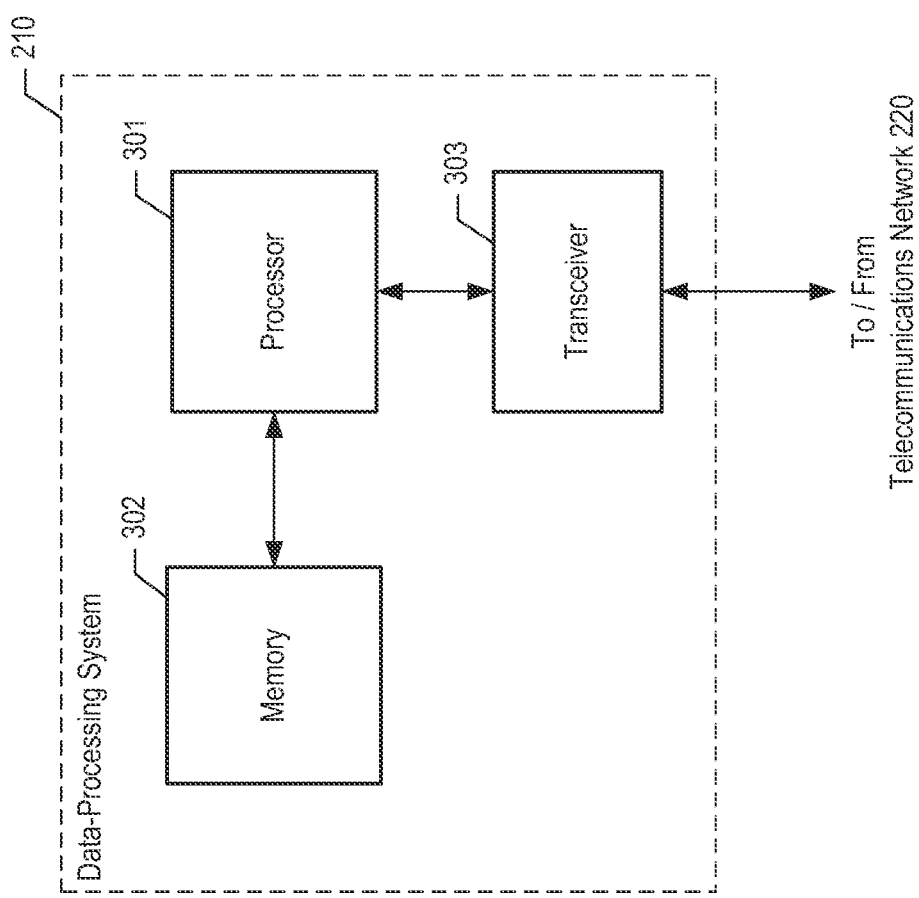
FIG. 3 depicts a block diagram comprising the salient elements of data-processing system 210, in accordance with the illustrative embodiment of the present invention.

FIG. 3 depicts a block diagram comprising the salient elements of data-processing system 210, in accordance with the illustrative embodiment of the present invention. Data-processing system 210 comprises: processor 301; memory 302; transceiver 303; and a communication path to telecommunications network 220, interconnected as shown.

Processor 301 is a processing device such as a microprocessor that, in conjunction with the other components in data-processing system 210, is capable of executing the software and processing the data according to the tasks described herein. Processor 301 processes data points and other data received via transceiver 303. Processor 301 is well known in the art.

Memory 302 is non-transitory memory that stores program code and data sufficient to enable the execution of software and data processing according to the tasks described herein. Memory 302 is well known in the art.

Transceiver 303 is a network interface component that enables data-processing system 210 to communicate electronically, whether in a wired or wireless configuration, with other components internal and external to sensor analytics system 200, including i) receiving data from telecommunications network 220, such as geolocation and accuracy data originating at the individual devices connected to network 220, and ii) transmitting data to devices connected to network 220, such as presentation data that is intended for wireless terminal 222. Transceiver 303 is well known in the art.

It will be clear to those skilled in the art, after reading the present disclosure, that data-processing system 210 can be embodied in a different configuration than that depicted, as a multi-processor platform, as a server (e.g., application server, etc.), as a sub-component of a larger computing platform, or in some other computing environment—all within the scope of the present invention. It will be clear to those skilled in the art, after reading the present disclosure, how to make and use data-processing system 210.

FIGS. 4 through 9 depict flowcharts and related examples of the salient tasks performed by data-processing system 210, in accordance with the illustrative embodiment of the present invention. The operations performed by system 210 are depicted in the drawings in a particular order and are sequential. It will, however, be dear to those skilled in the art after reading this disclosure that these operations can be performed in a different order from that depicted or can be performed in a non-sequential order, in some alternative embodiments. For example, in some alterative embodiments, system 210 can perform at least some of the described tasks by using multitasking and/or parallel processing. At least some of the depicted tasks can be combined, performed in a different order, performed by different devices, or omitted, in some alternative embodiments of the present invention.

Moreover, the separation of various components in the illustrative embodiment described herein should not be understood as requiring such separation in all embodiments of the present invention. Furthermore, it will be clear to those skilled in the art, after reading this disclosure, that the described program components and systems can generally be integrated together in a single software product or arranged into multiple software products.

For pedagogical purposes, the tasks depicted in the flowcharts herein are presented from the perspective of applying to a single user. It will, however, be clear to those skilled in the art, after reading this disclosure, that the performed operations can be applied to multiple users, either concurrently and/or sequentially. Furthermore, the depicted tasks can be repeated, either periodically and/or sporadically, for example in order to update the information that is processed for one or more users.

Figure 4:
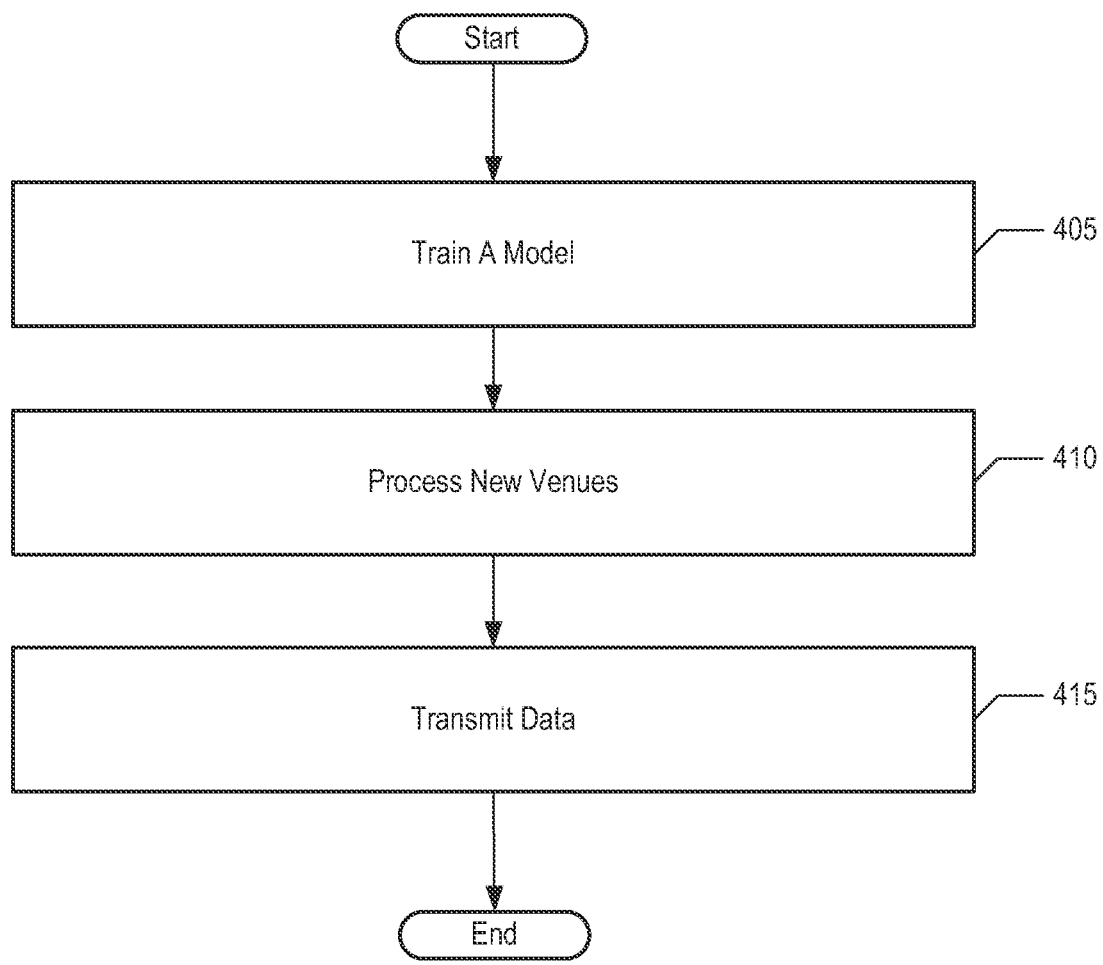
FIG. 4 depicts a flowchart of the salient tasks performed by data-processing system 210, in accordance with the illustrative embodiment of the present invention.

FIG. 4 depicts a flowchart of the salient tasks performed by data-processing system 210, as shown in FIG. 3, in accordance with the illustrative embodiment of the present invention.

At task 405, data-processing system 210 trains a model by using a training dataset of past check-ins. The trained model ranks venues according to their relevance to one or more users, and represents a learned hypothesis. Task 405 is described in detail below and with respect to FIG. 5.

At task 410, data-processing system 210 processes new venues, by i) applying the learned hypothesis (i.e., represented by the trained model) to newly received spatial-temporal data that corresponds to one or more users, or ii) identifying venues based on their proximity to a user's geolocation, or iii) using a combination of i) and ii). Task 410 is described below and with respect to FIG. 6, and results in one or more possible check-in venues being generated.

At task 415, data-processing system 210 transmits data to a user, including a non-empty set of one or more possible check-in venues. Task 415 is described below and with respect to FIG. 8.

As those who are skilled in the art will appreciate, after reading this specification, some or all of the subtasks that constitute the depicted tasks may be repeated, either sporadically or periodically. For example, as new venues open for business, or go out of business, the training data set changes, thereby requiring the model to be retrained at task 405. As another example, a particular user might send check-ins corresponding to multiple venues visited throughout a day, thereby requiring reprocessing of candidate venues, even for particular user, at task 410. Reprocessing due to additional check-ins can also require the model to be retrained at task 405.

Figure 5:
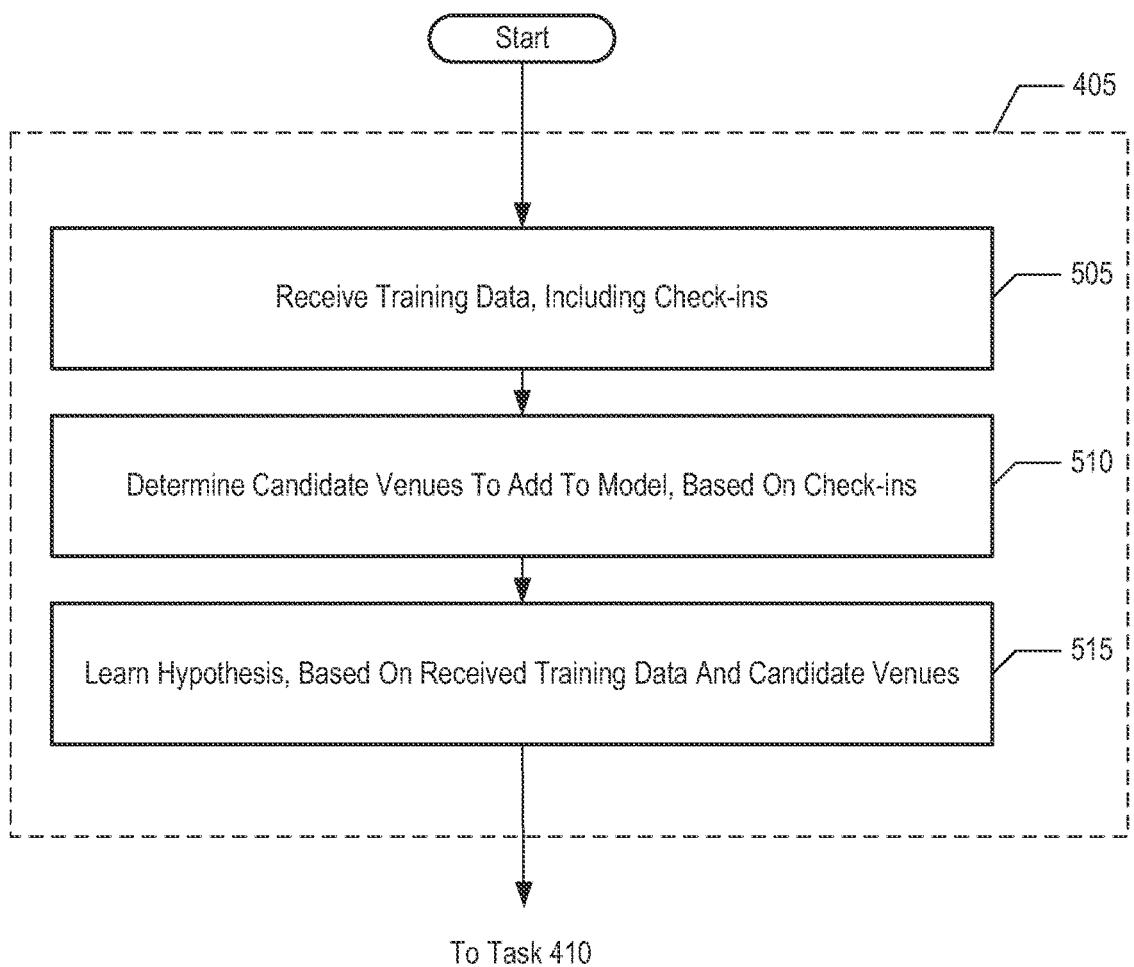
FIG. 5 depicts a flowchart of the salient subtasks of task 405.

FIG. 5 depicts a flowchart of the salient subtasks of task 405, in accordance with the illustrative embodiment of the present invention.

At task 505, data-processing system 210 receives training data that represents past check-in events. In accordance with the illustrative embodiment, the training data is conveyed by one or more signals and comprises one or more of the following elements, for example and without limitation, for past check-ins;
   i. a user identifier of each user who checked in,
   ii. a venue identifier of each venue at which a check-in occurred,
   iii. the calendrical time of the check-in,
   iv. the location of each venue at which a check-in occurred (e.g., geographic coordinates, etc.),
   v. additional user characteristics for each user who checked in (e.g., age, gender, interests, etc.),
   vi. additional venue characteristics for one or more venues included in the training data (e.g., type of venue, commercial codes, etc.), and
   vii. one or more criteria to determine proximity of a candidate venue to a visited venue (e.g., radius, shape of area of proximity, etc.).

At task 510, data-processing system 210 determines candidate venues to add to the model. For each venue at which a user has checked-in, system 210 identifies candidates venues in relation to the checked-into venue by identifying other venues that are nearby the checked-into venue. In accordance with the illustrative embodiment, system 210 identifies candidate venues as those venues within a predetermined distance (e.g., represented by radius, etc.) of the location of the checked-into venue, for all checked-into venues that are present in the training data. In order to find the venues that are within the predetermined distance, system 210 uses a search technique, such as a kd-tree search technique, as those who are skilled in the art will appreciate after reading this specification.

At task 515, data-processing system 210 learns a hypothesis, based on the user data and venue data for visited and candidate venues. For pedagogical purposes, the check-in data can be represented as matrix $\hat{M}$, an m-by-n matrix, where m is the number of users and n is the number of venues. $\hat{M}$ is assumed to be a partially observed version of unknown matrix M, also an m-by-n matrix, where $M_{i,j}=1$ if user i likes a venue j and $M_{i,j}=-1$ otherwise.

The partially-observed matrix $\hat{M}$ is affected by a lack of negative examples, in that if a check-in $\hat{M}_{i,j}$ has been observed, then user i likes venue j, but if a check-in has not been observed, then it is unknown as to whether the user likes that venue or not, as the user might not have had the opportunity to visit the venue. Therefore, and in accordance with the illustrative embodiment, system 210 imposes a spatial feedback, in order to account for that fact that users have not visited all venues on which the hypothesis is based. In particular, if user i has checked into venue j, but not to a nearby venue k, system 210 imposes the constraint that user i prefers venue j over venue k. In other words, a visited venue will rank higher than all of the other nearby venues, in learning the hypothesis. As those who are skilled in the art will appreciate, however, after reading this specification, the foregoing constraint can be softened or ignored entirely.

In accordance with the illustrative embodiment, data-processing system 210 approximates the unknown matrix M with a hypothesis matrix X, such that the maximum number of feedback-induced preferences is realized. Within this framework, a rank margin matrix factorization (RMMF) loss is defined as follows:

$$L_{RMMF}(X, \hat{M}) = \frac{1}{|E|} \sum_{(i,j,k) \in E} h(X_{i,j} - X_{i,k}) \qquad (1)$$

wherein X denotes the hypothesis matrix; the function h is the hinge loss function, in some embodiments; and $E=\{(i,j,k)|(i,j)\in\Omega, k\in N(j)\}$ is the set of index tuples that represents the users' venue preferences, in which $(i,j,k)\in E$ if and only if user i prefers venue j over venue k, $\Omega$ denotes the set of observed indices of $\hat{M}$, and N(j) is the indices of venues that are in the candidate set of j.

As a matter of practicality, equation (1) is regarded as an upper bound to the following expression:

$$\frac{1}{|E|} \sum_{(i,j,k) \in E} [[X_{i,k} \geq X_{i,j}]] \qquad (2)$$

wherein [[·]] denotes an indicator function whose value is 1 if its argument is true and 0 otherwise. As a result, equation (1) is a convex upper bound to the loss associated with the fraction of preference misorderings, the number of which to be minimized by minimizing the RMMF loss.

In order to control the complexity of the hypothesis space, for the purpose of preventing overfitting, in some embodiments system 210 enforces X to have both a low-rank and a low Frobenius norm. The RMMF objective to be minimized is defined as follows:

$$J(U, V) = \frac{\lambda}{2}(\|U\|_F^2 + \|V\|_F^2) + \frac{1}{|E|} \sum_{(i,j,k) \in E} h((UV^T)_{i,j} - (UV^T)_{i,k}) \quad (3)$$

wherein $\|*\|_F$ denotes the Frobenius norm; an upper bound is applied to the rank of X; $U \in R^{m \times r}$ and $V \in R^{n \times r}$ are the factor matrices, in which $X = UV^T$; and $\lambda$ is a regularization parameter.

Equation (3) is extended to contextual features in the following equation:

$$K(U, V, w) = \frac{\lambda}{2}(\|U\|_F^2 + \|V\|_F^2) + \frac{\gamma}{2}\|w\|^2 + \\ \frac{1}{|E|} \sum_{(i,j,k) \in E} h((UV^T)_{i,j} - (UV^T)_{i,k} + w^T(F_{i,j,\tau(i,j)} - F_{i,k,\tau(i,j)})) \quad (4)$$

wherein $F_{i,j,t} \in R^q$ denotes the feature vector corresponding to user i, venue j, and local time t; $\tau(i,j)$ denotes the local time at which user i checks into venue j; and $w \in R^q$ denotes the coefficients associated with the features; and $\lambda$ and $\gamma$ are ragularization parameters.

Equation (4) accounts for the contextual feature of time-of-day. As those who are skilled in the art will appreciate after reading this specification, equation (4) can be derived to be a function of additional or other contextual features such as, but not limited to, type of venue, user gender, user birth date, distance of user's geolocation to one or more venues, level of accuracy of the user's geolocation, and other venue and/or user features.

Various algorithms can be used to optimize the objectives represented by (3) and (4) above, such as the Pegasos and L-BFGS algorithms, for example and without limitation.

Referring again to FIG. 5, the learned hypothesis is then made available to the processing associated with task 410.

Figure 6:
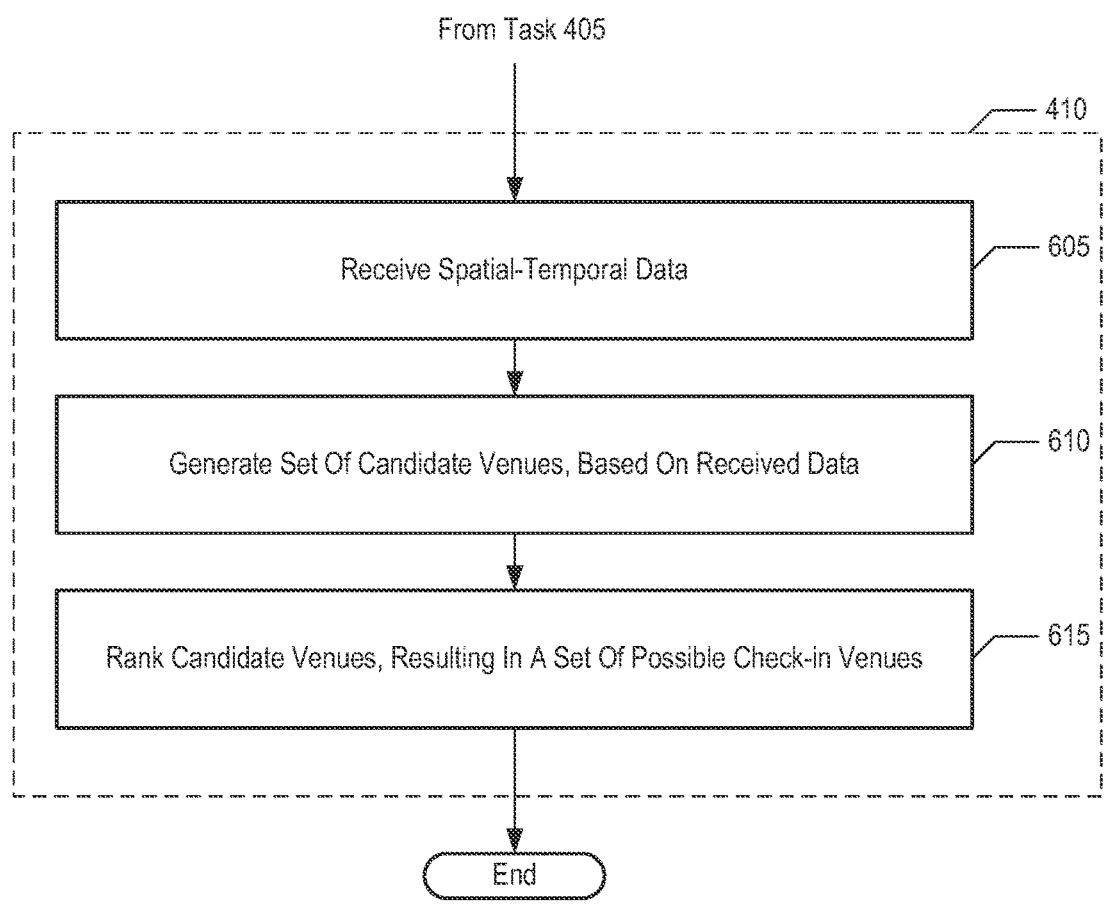
FIG. 6 depicts a flowchart of the salient subtasks of task 410.

FIG. 6 depicts a flowchart of the salient subtasks of task 410, in accordance with the illustrative embodiment of the present invention.

At task 605, data-processing system 210 receives spatial-temporal data that represents current activity on the part of a user, along with other user-related data. In accordance with the illustrative embodiment, the received data is conveyed by one or more signals and comprises one or more of the following elements, for example and without limitation;
  i. a user identifier of a user,
  ii. the geolocation of the user,
  iii. the level of accuracy of the geolocation,
  iv. the calendrical time corresponding to when the user was at the location,
  v. additional user characteristics for the user (e.g., age, gender, interests, etc.).

The assessed location, or "geolocation," of the wireless terminal 222, is used to represent the geolocation of the terminal's user. The geolocation is expressed in terms of latitude and longitude, as part of a geographic coordinate system. As those who are skilled in the art will appreciate, after reading this specification, a different coordinate system can be used such as the following, for example and without limitation: i) Cartesian, ii) Polar, iii) cylindrical, iv) spherical, v) homogeneous, vi) based on latitude and longitude, or vii) representative of a location with respect to one or more geographic features or landmarks (e.g., cities, bodies of water, highways, monuments, buildings, bridges, other structures, etc.).

The geolocations of a particular user are derived from the geolocations of a single wireless terminal, in the illustrative embodiment of the present invention. However, it will be clear to those skilled in the art, after reading this specification, how to make and use embodiments of the present invention in which the geolocations of a particular user can be derived from those of a first wireless terminal during a first period of time, a second wireless terminal during a second period of time, and so on. For example, a user might use multiple cell phones (one for work, one for personal use, etc.) or might have replaced a previous cell phone with a new cell phone.

The level of accuracy is expressed in terms of an accuracy radius (e.g., actual location within m meters of the reported geolocation) and a confidence level (e.g., p percent). If it is not part of the reported level of accuracy, the confidence level can be inferred based on knowledge of the type of wireless terminal reporting or the geolocation algorithm being used, or both. For example, it might be known ahead of time that a particular geolocation algorithm in use calculates the accuracy radius with a confidence level of 95%.

At task 610, data-processing system 210 generates a set of candidate venues in relation to the geolocation of the user. In accordance with the illustrative embodiment, system 210 determines candidate venues by identifying venues that are within a geographic area that is defined by the user's geolocation. However, as the level of accuracy of the geolocation might be poor, the geolocation of the user might be useable only as a rough approximation of the user's current location (e.g., to narrow down the geographic area of interest to Midtown Manhattan versus New York City overall, etc.).

In some embodiments of the present invention, system 210 also uses the level of accuracy received at task 605 to determine the candidate venues to be considered in the subsequent ranking. In such embodiments, system 210 defines the geographic area that contains the candidate venues, as a shape (e.g., a circle, etc.) that is centered at the reported geolocation and that extends outwards from the geolocation point to a distance that is a function of the reported level of accuracy (e.g., twice the reported accuracy radius for a 95% confidence level, etc.). For example and without limitation, system 210 might use the accuracy distance in this manner for computational reasons—that is, to reduce the computational burden by limiting the geographic area tinder consideration.

In some embodiments of the present invention, system 210 uses the calendrical time corresponding to the geolocation of the user, in the data received at task 605, in order to generate the set of candidate venues in a time context. For example, it might be appropriate to include or exclude one or more categories of venues during lunchtime (e.g., include sandwich shops and dry cleaners, exclude dance clubs, etc.), whereas it would make sense to include or exclude a different set of categories late in the evening (e.g., include singles bars and all-night diners, exclude breakfast buffets and craft stores, etc.). In some alternative embodiments, the use of the calendrical time to generate the candidate venues is dependent on the received level of accuracy.

In some embodiments of the present invention, system 210 uses a user's prior commercial exposure to one or more commercial categories, in order to generate the set of candidate venues. For example and without limitation, in generating the set of candidate venues, system 210 can track a user as having been exposed to one or more of the following commercial categories:
  i. One or more of J North American Industry Classification System (NAICS) codes;
  ii. One or more of K restaurant types;
  iii. One or more of L cuisine types; and
  iv. One or more of M top retail chains (e.g., Circle K, Starbucks, etc.),
wherein J, K, L, and M are positive integers. In some alternative embodiments, the use of the one or more commercial categories is dependent on the received level of accuracy.

At task 615, data-processing system 210 generates the set of possible check-in venues by ranking the candidate venues generated at task 610, resulting in a ranked set of venues. System 210 uses, as input data to the ranking process, the user identifier and the set of candidate venues for the user that was generated at task 705. In order to rank the candidate venues, system 210 applies the hypothesis learned at task 515 to the foregoing input data. Techniques for applying a hypothesis to data, in general, are well known in the art.

As described above and with respect to task 515, in some embodiments of the present invention, the hypothesis incorporates a rule of preferring a visited venue (e.g., a checked-into venue, etc.) to a non-visited venue. In such embodiments, the ranking can take into account the overall popularity of one or more venues, or a particular user's history of having visited one or more venues, or both.

In some embodiments of the present invention, system 210 can use the level of accuracy received at task 605 for the purpose of adjusting the ranking that is produced by applying the hypothesis as discussed above. For example, if the level of accuracy is marginal, but not poor, system 210 can increase the ranked value of one or more venues based on their proximity to the geolocation of the user. As another example, system 210 can select a particular hypothesis to apply, based on the user's geolocation, or based on the distance of the user's geolocation to something else (e.g., one or more venues, etc.), or based on the level of accuracy of the user's geolocation, for example and without limitation.

In some embodiments of the present invention, system 210 uses the calendrical time that corresponds to the user being at a geolocation, in the data received at task 605, in order to rank candidate venues in a time context. For example, it might be appropriate to rank higher or lower one or more categories of venues during lunchtime (e.g., rank sandwich shops and dry cleaners higher, rank dance clubs lower, etc.), whereas it would make sense to rank higher or lower a different set of categories late in the evening (e.g., rank singles bars and all-night diners higher, rank breakfast buffets and craft stores lower, etc.). In some alternative embodiments, the use of the calendrical time to rank candidate venues is dependent on the received level of accuracy.

In some embodiments of the present invention, system 210 uses a user's prior commercial exposure to one or more commercial categories, in the ranking of candidate venues. For example and without limitation, in the ranking of candidate venues, system 210 can account for the commercial categories that are described above and with respect to task 705. In some alternative embodiments, the use of the prior commercial exposure in the ranking of candidate venues is dependent on the received level of accuracy.

In some embodiments of the present invention, system 210 is able to use additional characteristics that are made available to system 210, in the ranking of candidate venues. For example and without limitation, system 210 is able to account for one or more characteristics (e.g., gender, birth date, commercial exposure, demographic exposure, etc.) of one or more users, in the data received at task 605. In any event, it will be clear to those skilled in the art, after reading this specification, how to make and use embodiments of the present invention, in which system 210 considers i) calendrical time, ii) one or more user characteristics, iii) one or more venue characteristics, or iv) other characteristics, in any combination, in the ranking of candidate venues. Furthermore, it will be clear to those skilled in the art, after reading this specification, how to make and use embodiments of the present invention, in which system 210 refrains from considering one or more of calendrical time, user characteristics, venue characteristics, and other characteristics, in the ranking of candidate venues.

In some alternative embodiments of the present invention, the very notion of whether to use ranking at all can be based on the level of accuracy received at task 605. In such embodiments, data-processing system 210 determines whether the level of accuracy received requires that possible check-in venues be generated based on ranking. For example, if the reported accuracy is insufficient to justify purely proximity-based venue generation, then system 210 can generate the set of venues based on ranking; in this case, the reported accuracy can be deemed insufficient when it fails to meet and/or exceed a predetermined level.

Figure 7B:
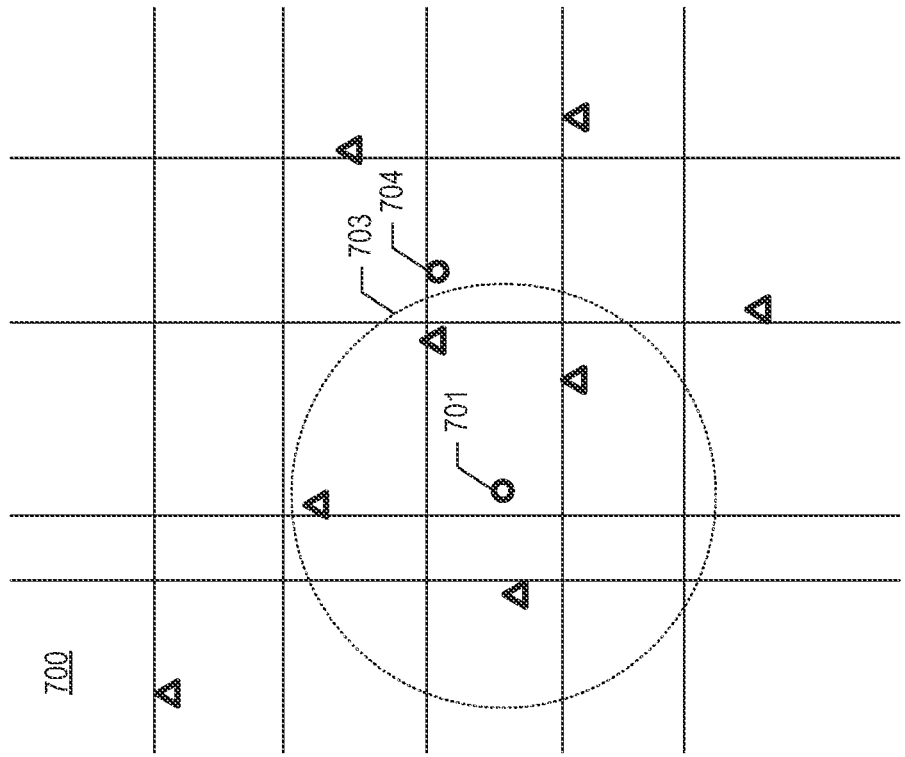
FIGS. 7A and 7B depict examples of how possible check-in venues can be generated.
Figure 7A:
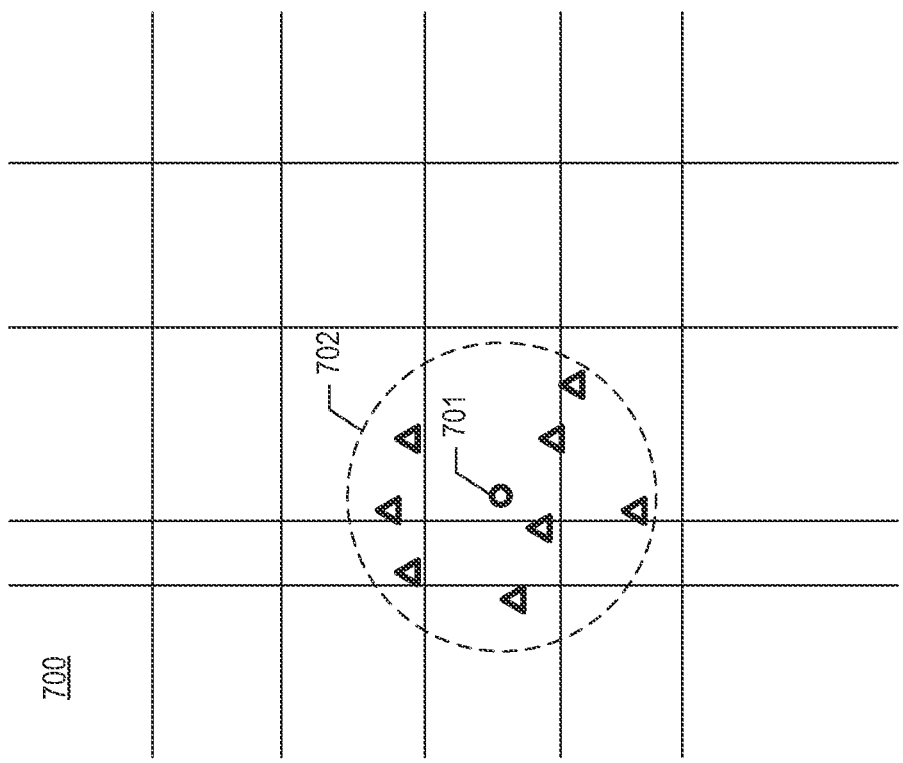

FIGS. 7A and 7B depict examples of how possible check-in venues can be generated. Geographic area 700 is depicted in each figure and is characterized by local geographic information (e.g., streets, buildings, boundaries, etc.) that is displayed in well-known fashion.

FIG. 7A reflects a method of identifying possible check-in venues based purely on the proximity of those venues to the geolocation of user 701, without the use of ranking. When user 701's geolocation is made available, data-processing system 210 determines the candidate venues in relation to the geolocation of the user, in well-known fashion. System 210 identifies possible check-in venues within a predetermined radius of the user, wherein the radius in combination with the geolocation defines area of proximity 702. The identified possible check-in venues are represented with triangles in the figure.

In contrast, FIG. 7B reflects the ranking method of identifying possible check-in venues based on ranking by applying a learned hypothesis, in accordance with the illustrative embodiment of the present invention. When user 701's geolocation and the level of accuracy of the geolocation are made available, data-processing system 210 determines that it will use the ranking method of the illustrative embodiment. System 210 generates the candidate venues and ranks the candidate venues to obtain the possible check-in venues, as discussed above and with respect to tasks 610 and 615, respectively. In some embodiments, system 210 uses the level of accuracy, whose accuracy radius component defines accuracy disk 703, in order to select which of several hypotheses to apply, as part of the ranking process.

As seen in the two figures, the two methods can yield different results. In FIG. 7A, the venues are clustered around the geolocation of user 701, while in FIG. 7B, the venues are, in essence, predictions of where the user is most likely to check into next. The geolocation of user 701 in FIG. 7B is presumed to be erroneous in the case of a low level of accuracy; conceivably, the user can be at location 704, for example. Necessarily, the possible check-in venues are based on factors other than proximity to a geolocation, such as, while not being limited to, the user's past behavior and possibly other users' past behaviors.

Figure 8:
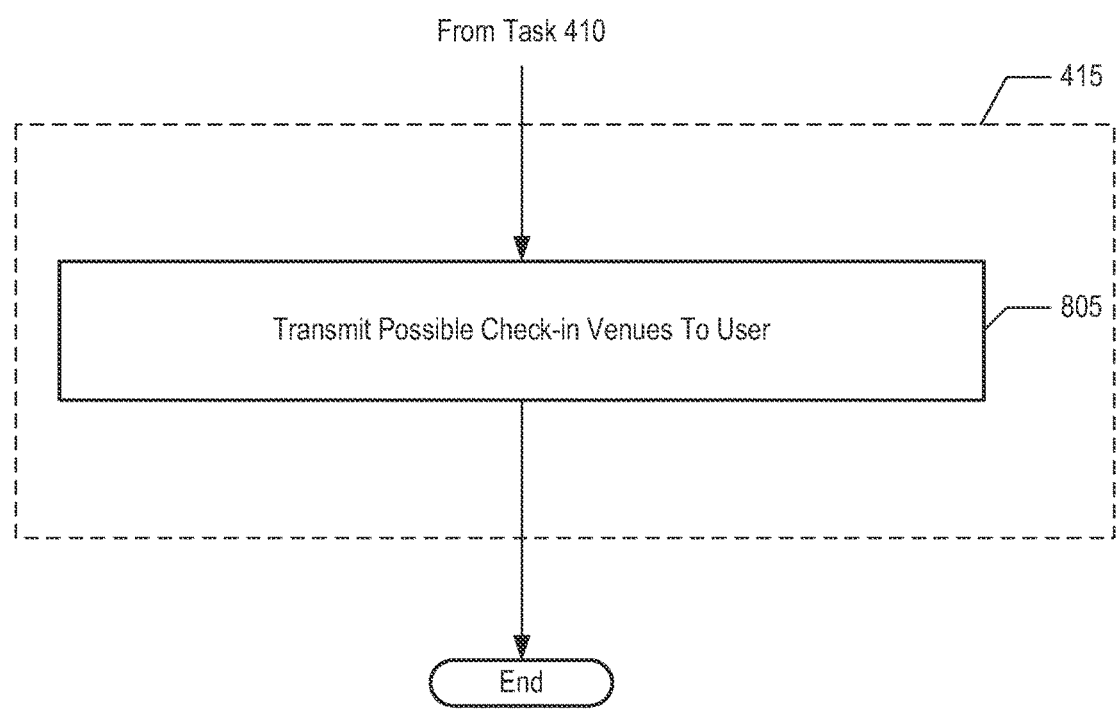
FIG. 8 depicts a flowchart of the salient subtasks of task 415.

FIG. 8 depicts a flowchart of the salient subtasks of task 415, in accordance with the illustrative embodiment of the present invention.

At task 805, data-processing system 210 formats and transmits a set of possible check-in venues to wireless terminal 222 associated with a user. The information to be transmitted is first formatted so that the check-in venues are displayable by the receiving device. System 210 then transmits some or all of the ranked set of venues as the possible check-in venues, conveying the transmitted information via one or more signals in well-known fashion. System 210 transmits the information to the user's wireless terminal, such as wireless terminal 222, at which the information can be displayed. As those who are skilled in the art will appreciate, after reading this specification, system 210 can output, transmit, and/or present the information in some other way. For example and without limitation, system 210 can provide the ranked-set information to a different wireless terminal, a different type of device than a wireless terminal, or to a different user entirely, in some embodiments of the present invention. As discussed earlier, at least some of the venues presented to the user might be based on their proximity to the user instead of or in addition to being based on ranking, in some embodiments of the present invention.

In some embodiments of the present invention, out of all of the ranked-set information, system 210 presents only the highest-ranked candidate venue from the ranked set, as the most likely check-in candidate. Presenting only the highest-ranked candidate to the user is advantageous, for example, where there are space constraints on the display of the user's wireless terminal. In some other embodiments of the present invention, system 210 presents any number of venues from the ranked set, such as and without limitation: i) the top N candidate venues in terms of ranking, wherein N is a positive integer; ii) all of the candidate venues in ranked order; or iii) some or all of the candidate venues in an ordering other than ranked, with or without additional information.

Figure 9:
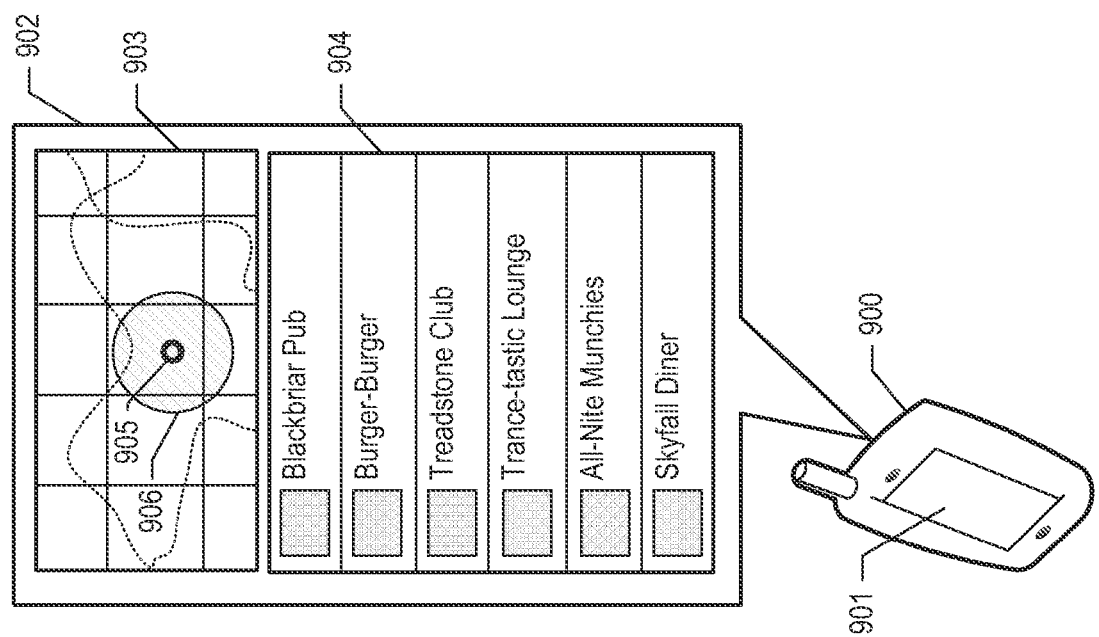
FIG. 9 depicts an example of how the set of possible check-in venues is presented to a user, though wireless terminal 900.

FIG. 9 depicts an example of how the set of possible check-in venues is presented to a user, though wireless terminal 900, in accordance with the illustrative embodiment of the present invention. Terminal 900 is an example of wireless terminal 222 and comprises physical display 901, which is capable of presenting the information conveyed in check-in display mode 902. Check-in display mode 902 comprises map display 903 and venue display 904. For illustrative purposes, the time of day at the terminal is 11:00 pm on a Saturday night.

Terminal 900 presents map display 903, comprising local geographic information (e.g., streets, buildings, boundaries, etc.) displayed in well-known fashion. The geolocation of the user is also displayed, depicted as location 905, in relation to the local geographic information, and accuracy disk 906 in relation to the user's geolocation. In some other embodiments, something else is displayed such as a "loading" icon of a status message (e.g., "Location being determined, Location unavailable, etc.).

Terminal 900 also presents venue display 904, comprising the possible check-in venues transmitted to the terminal at task 415. In this example, the check-in venues have been generated as the result of a contextual ranking, in terms of time-of-day. As a result of the contextual ranking and the time of day being 11:00 pm on a Saturday night, the venues are primarily made up of late-night activities, including entertainment clubs and eateries. Although one or more of the venues might be close to the user's geolocation, it is not necessarily the case that all of the venues are close to the user's geolocation, as the ranking method is able to consider criteria other than proximity in order to predict the user's most likely next check-ins.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products—that is, one or more modules of computer program instructions encoded on a computer-readable medium for execution by, or to control the operation of, a data-processing system. The computer-readable medium can be a machine-readable storage device, a machine-readable storage substrate, a memory device, or a combination of one or more of them. The term "data-processing system" encompasses ail apparatus, devices, and machines for processing data, including by way of example a programmable processor, a computer, or multiple processors or computers. The data-processing system can include, in addition to hardware, code that creates an execution environment for the computer program in question, such as code that constitutes processor firmware, a protocol stack, a database management system, an operating system, or a combination of one or more of them.

It is to be understood that the disclosure teaches just one example of the illustrative embodiment and that many variations of the invention can easily be devised by those skilled in the art after reading this disclosure and that the scope of the present invention is to be determined by the following claims.

What is claimed is:

1. A system comprising:
   a data-processing system comprising one or more processors communicatively coupled to a data store, the data-processing system further comprising memory coupled to the one or more processors and storing instructions that, when executed by the one or more processors, cause the data-processing system to:
   receive a first geolocation of a first user;
   generate a non-empty set of candidate venues based at least in part on the first geolocation;
   determine whether a level of accuracy of the first geolocation of the first user satisfies an accuracy threshold;
   consequent to a determination that the level of accuracy of the first geolocation of the first user does not satisfy the accuracy threshold, rank the candidate venues, wherein the ranking results in a non-empty set of possible check-in venues; and
   transfer one or more of the possible check-in venues from the non-empty set of possible check-in venues to facilitate presentation of the one or more of the possible check-in venues with a device.

2. The system of claim 1, wherein the ranking the candidate venues is based at least in part on applying to the candidate venues a hypothesis that is learned from locations of one or more venues that are visited by at least one of i) the first user and/or ii) one or more additional users, wherein the hypothesis is selected from a set of two or more hypotheses based at least in part on the first geolocation.

3. The system of claim 2, wherein the hypothesis is selected from the set of two or more hypotheses based at least in part on the level of accuracy of the first geolocation or a distance of the first geolocation to at least one other venue.

4. The system of claim 2, wherein the level of accuracy corresponds to an accuracy radius with respect to the first geolocation.

5. The system of claim 4, wherein a confidence indicator is attributed to the level of accuracy.

6. The system of claim 1, wherein the instructions further cause the data-processing system to:
receive a calendrical time identifier of when the first user was at the first geolocation;
determine, based at least in part on the level of accuracy of the first geolocation, whether to use the calendrical time identifier in processing the non-empty set of candidate venues; and
consequent to a determination based at least in part on the level of accuracy of the first geolocation to use the calendrical time identifier, process the non-empty set of candidate venues based at least in part on the calendrical time identifier.

7. The system of claim 6, wherein the processing the non-empty set of candidate venues based at least in part on the calendrical time identifier comprises:
determining a set of venue categories based at least in part on the calendrical time identifier; and
including and/or excluding one or more candidate venues based at least in part on the determined set of venue categories; and/or
ranking the candidate venues based at least in part on the determined set of venue categories.

8. One or more non-transitory, processor-readable media storing instructions that, when executed by a data-processing system, cause the data-processing system to:
receive a first geolocation of a first user;
generate a non-empty set of candidate venues based at least in part on the first geolocation;
determine whether a level of accuracy of the first geolocation of the first user satisfies an accuracy threshold;
consequent to a determination that the level of accuracy of the first geolocation of the first user does not satisfy the accuracy threshold, rank the candidate venues, wherein the ranking results in a non-empty set of possible check-in venues; and
transfer one or more of the possible check-in venues from the non-empty set of possible check-in venues to facilitate presentation of the one or more of the possible check-in venues with a device.

9. The one or more non-transitory, processor-readable media of claim 8, wherein the ranking the candidate venues is based at least in part on applying to the candidate venues a hypothesis that is learned from locations of one or more venues that are visited by at least one of i) the first user and/or ii) one or more additional users, wherein the hypothesis is selected from a set of two or more hypotheses based at least in part on the first geolocation.

10. The one or more non-transitory, processor-readable media of claim 9, wherein the hypothesis is selected from the set of two or more hypotheses based at least in part on the level of accuracy of the first geolocation or a distance of the first geolocation to at least one other venue.

11. The one or more non-transitory, processor-readable media of claim 9, wherein the level of accuracy corresponds to an accuracy radius with respect to the first geolocation.

12. The one or more non-transitory, processor-readable media of claim 11, wherein a confidence indicator is attributed to the level of accuracy.

13. The one or more non-transitory, processor-readable media of claim 8, wherein the instructions further cause the data-processing system to:
receive a calendrical time identifier of when the first user was at the first geolocation;
determine, based at least in part on the level of accuracy of the first geolocation, whether to use the calendrical time identifier in processing the non-empty set of candidate venues; and
consequent to a determination based at least in part on the level of accuracy of the first geolocation to use the calendrical time identifier, process the non-empty set of candidate venues based at least in part on the calendrical time identifier.

14. The one or more non-transitory, processor-readable media of claim 8, wherein the processing the non-empty set of candidate venues based at least in part on the calendrical time identifier comprises:
determining a set of venue categories based at least in part on the calendrical time identifier; and
including and/or excluding one or more candidate venues based at least in part on the determined set of venue categories; and/or
ranking the candidate venues based at least in part on the determined set of venue categories.

15. A method comprising:
receiving by a data-processing system a first geolocation of a first user;
generating by the data-processing system a non-empty set of candidate venues based at least in part on the first geolocation;
determining by the data-processing system whether a level of accuracy of the first geolocation of the first user satisfies an accuracy threshold;
consequent to a determination that the level of accuracy of the first geolocation of the first user does not satisfy the accuracy threshold, ranking by the data-processing system the candidate venues, wherein the ranking results in a non-empty set of possible check-in venues; and
transmitting by the data-processing system one or more of the possible check-in venues from the non-empty set of possible check-in venues to facilitate presentation of the one or more of the possible check-in venues with a device.

16. The method of claim 15, wherein the ranking the candidate venues is based at least in part on applying to the candidate venues a hypothesis that is learned from locations of one or more venues that are visited by at least one of i) the first user and/or ii) one or more additional users, wherein the hypothesis is selected from a set of two or more hypotheses based at least in part on the first geolocation.

17. The method of claim 16, wherein the hypothesis is selected from the set of two or more hypotheses based at least in part on the level of accuracy of the first geolocation or a distance of the first geolocation to at least one other venue.

18. The method of claim 16, wherein the level of accuracy corresponds to an accuracy radius with respect to the first geolocation, and wherein a confidence indicator is attributed to the level of accuracy.

19. The method of claim 15, further comprising:
receiving, by the data-processing system, a calendrical time identifier of when the first user was at the first geolocation;
determining, by the data-processing system and based at least in part on the level of accuracy of the first geolocation, whether to use the calendrical time identifier in processing the non-empty set of candidate venues; and
consequent to a determination based at least in part on the level of accuracy of the first geolocation to use the calendrical time identifier, processing by the data-processing system the non-empty set of candidate venues based at least in part on the calendrical time identifier.

20. The method of claim 19, wherein the processing the non-empty set of candidate venues based at least in part on the calendrical time identifier comprises:
determining a set of venue categories based at least in part on the calendrical time identifier; and
including and/or excluding one or more candidate venues based at least in part on the determined set of venue categories; and/or
ranking the candidate venues based at least in part on the determined set of venue categories.

* * * * *